Patented Sept. 7, 1926.

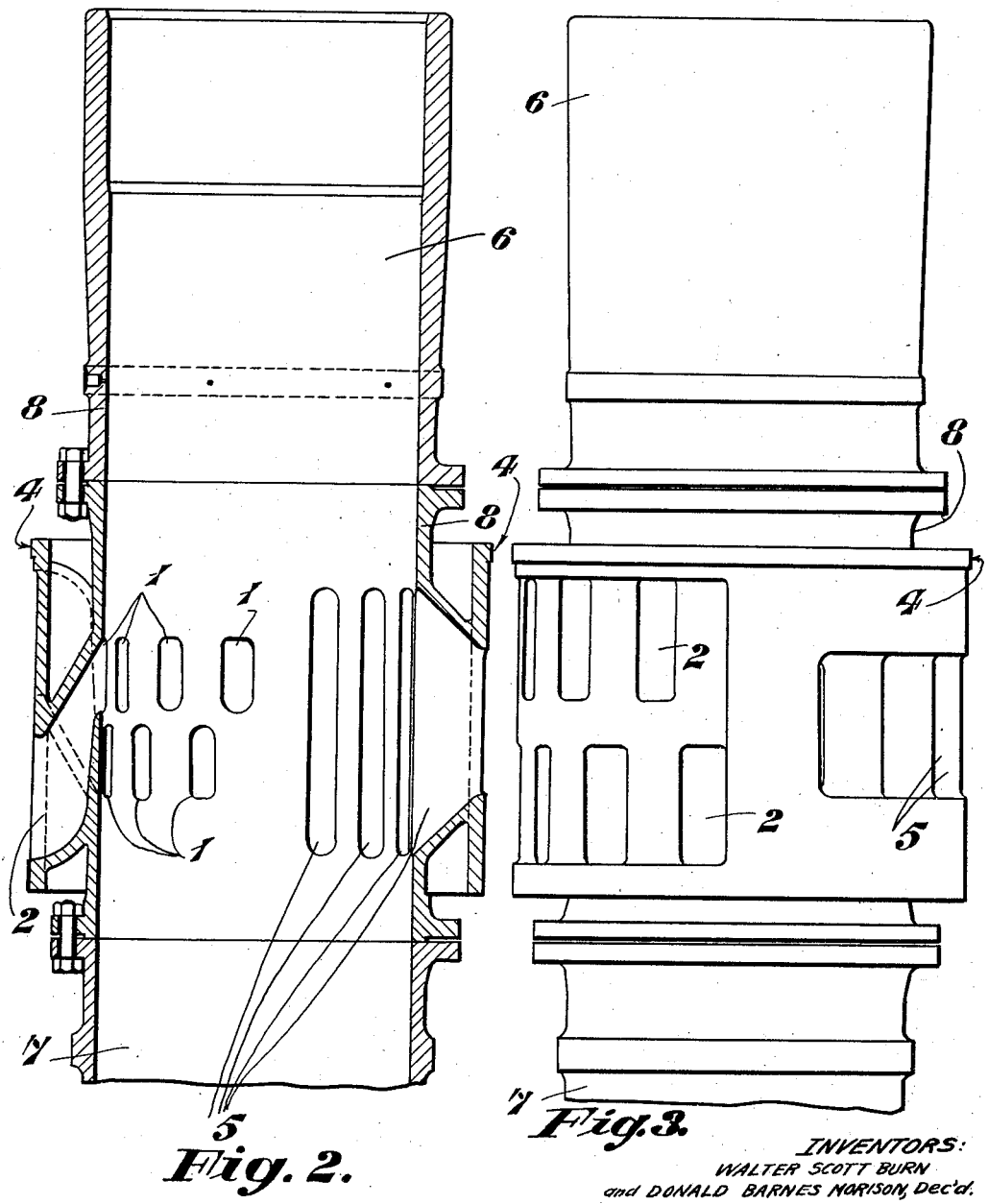

1,599,242

UNITED STATES PATENT OFFICE.

DONALD BARNS MORISON, DECEASED, LATE OF HARTLEPOOL, ENGLAND; BY RICHARD BARNS MORISON, OF STARCROSS; ROBERT EDWARD TUCKER, OF ASHBURTON; AND HENRY RICHARD EVANS, OF BROADHEMPSTON, ENGLAND, LEGAL REPRESENTATIVES; AND WALTER SCOTT BURN, OF HARTLEPOOL, ENGLAND.

INTERNAL-COMBUSTION ENGINE.

Application filed May 29, 1926, Serial No. 112,676, and in Great Britain December 12, 1924.

This invention relates to internal combustion engines and has for its object to provide for effective scavenging combined with a cylinder construction which will be cheap and simple of manufacture and assembly and subject to minimum heat and mechanical stresses.

An internal combustion engine cylinder according to the present invention has a liner or cylinder which is composed of three portions the middle or intermediate portion being formed with inlet or scavenge and exhaust ports, the inlet or scavenge ports forming the delivery ends of axially directed nozzles, i. e. nozzles which direct the streams of incoming air towards the cylinder ends.

A cylinder according to the preferred embodiment of the invention comprises two separate portions an inner portion consisting of the liner or cylinder and an outer portion consisting of the cylinder jacket, both the inner and outer portions being composed each of three parts.

It is to be understood that no claim is made to a liner per se composed of three portions or to inlet or scavenge ports per se which direct the streams of incoming air towards the cylinder ends.

In order that the invention may be clearly understood an embodiment of the same will now be described by aid of the accompanying drawings in which:—

Figures 2 and 3 illustrate the assembled liner in section and elevation.

Figure 1:
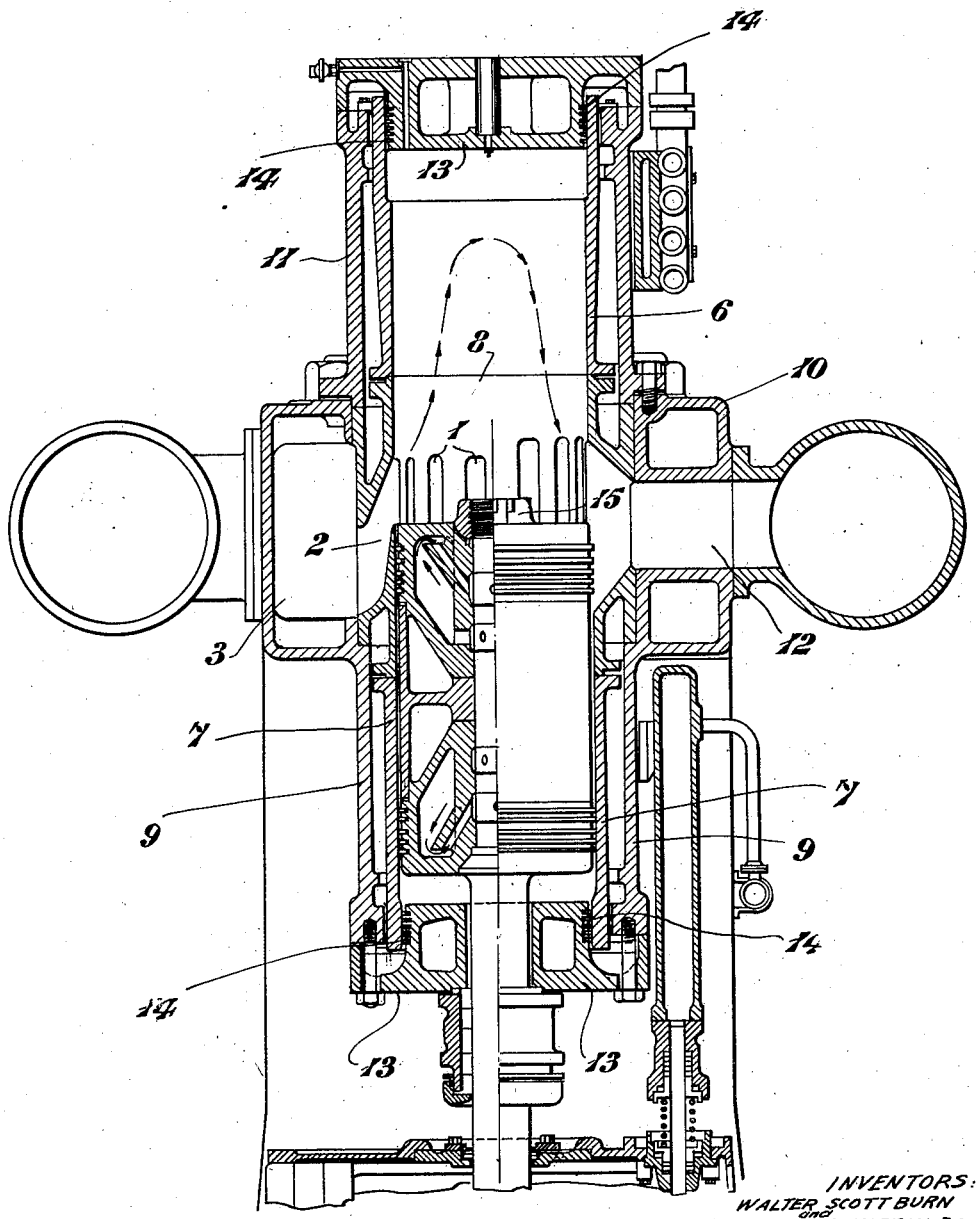
Figure 1 is a vertical section through a complete cylinder according to this invention showing the form of piston it is proposed to adopt and the line of flow of the scavenge air.
Figure 4:
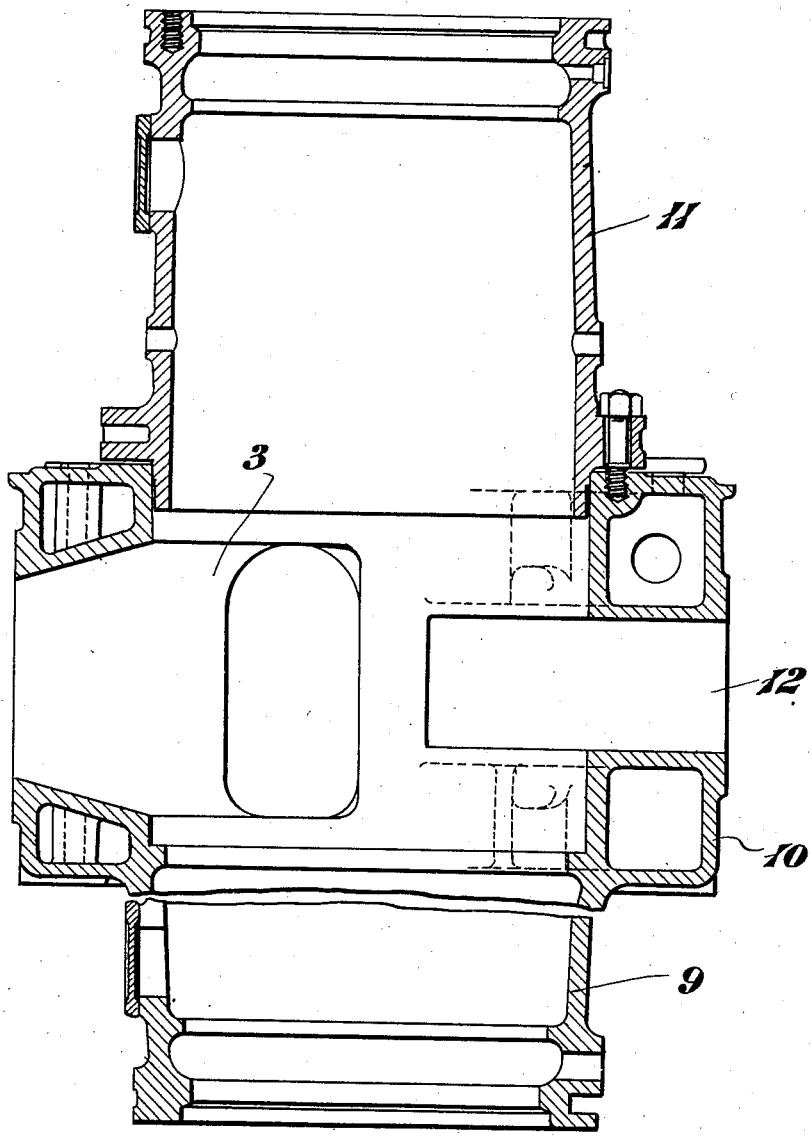
Figure 4 is a sectional elevation of the assembled cylinder casing or jacket.
Figure 5:
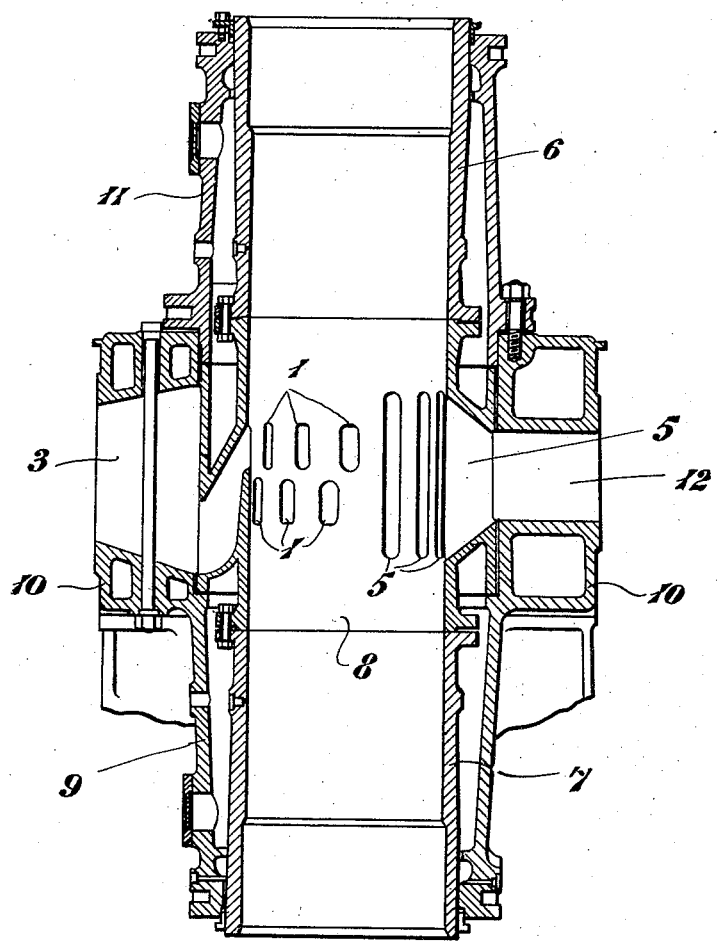
Figure 5 is a sectional elevation showing an assembled liner fitted into an assembled cylinder casing or jacket.

In the arrangement illustrated we provide separate inlet ports 1 for each end of the cylinder and we provide nozzle passages 2 leading to these ports from the scavenge receiver or air inlet way 3. The nozzles are arranged at a suitable acute angle to the cylinder ends and are of a suitable size and shape to ensure the scavenge air operating in such a manner as to produce a maximum scavenging efficiency. The scavenge portion of the scavenge and exhaust belt 4 is, according to this specific construction, divided up circumferentially into a number of scavenge nozzles which are alternately directed upwards for the top cylinder and downwards for the bottom cylinder.

The scavenge ports for the top and bottom cylinders whilst being quite separate and independent are thus contrived within a minimum of axial length of cylinder and further more the exhaust ports 5 may be made of such a length as to be made common as shown for the top and bottom combustion chambers. Thus only one scavenge belt and one exhaust belt is required for both top and bottom cylinders and the axial length of the cylinder will be little more than that of a normal cylinder for single acting engines.

The general cylinder construction which permits of the foregoing method of scavenging comprises an inner portion consisting of a liner which is composed of two end portions 6 and 7 and an intermediate portion 8 which contains the inlet ports 1, nozzle passages 2 and exhaust ports 5, and an outer portion consisting of a cylinder jacket which is composed in the example illustrated of a lower jacket 9 cast integral with an entablature or casing 10 consisting of a box disposed substantially midway of the cylinder as a whole and encircling the intermediate liner portion 8 and a separate upper jacket 11 which is of similar form to the lower jacket. The various appropriate elements of the construction are bolted together and to the columns to form, with the bed plate a rigid girder construction. A part of the casing aforesaid on one side forms the receiver 3 for the scavenge air while the remaining part is water cooled and embodies the main exhaust 12. The liner is supported at the centre about the scavenge and exhaust belt in the cylinder entablature and is held in place by the upper cylinder jacket in such a manner that both ends of the liner are capable of expansion axially as they are provided with expansion rings 14, and that simple water joints are made between the exhaust scavenge belt and the water jackets by interposing jointing rings between the spigot in the cylinder casing and the liner belt, and between the belt and the upper cylinder jacket, so dispensing with the usual groove and rubber ring form of jointing.

The cylinder heads 13 are formed hollow and are provided with water cooling passages, whilst the gas joints between the cylinder heads and the cylinders 6 and 7 are effected by means of spring rings 14 of known type, so that the liners are free to expand axially in relation to both the cylinder heads 13 and the jackets 11. It will thus be seen that the liner itself is subjected to no loading axially. A small gland or other water joint is provided at the top of the jacket to prevent any leakage of water from the cylinder jacket. As the system of scavenging is independent of the shape of the piston top, the combustion chamber may be of any suitable simple form. Moreover, if the nut 15 on the top of the piston which secures the piston to the piston rod is made circular as shown and of about the same diameter as the piston rod at the opposite end of the cylinder, the rod being of a length approximating the depth of the combustion chambers at dead centre position both of the crank shaft and combustion chambers will be annular and of substantially the same shape and volume, and at the commencement of the power stroke in either direction thus enabling identical fuel spray arrangements to be made for top and bottom cylinders. Two or more fuel valves may be used and accommodated in appropriate positions in each cover. The gland through which the piston rod slides is, according to this construction located entirely outside the cylinder head so that the central hole in the head is of minimum size, whilst the narrow annular space formed between the piston rod and cylinder head constitutes a comparatively long leakage path from the combustion chamber and as the surfaces adjacent this leakage path are water cooled these gases are subjected to effective cooling action. An advantage of this construction is that that part of the piston rod which might be effected by the fuel spray cannot enter the working part of the gland.

It will be appreciated that this construction while lending itself to the special method of scavenging, is such that the liner itself may be withdrawn by simply removing the top head and top cylinder jacket.

The upper cylinder casing may be attached to the lower cylinder casing by a flange and studs as indicated, or heavy lugs may be cast on the upper cylinder and the whole held together by extensions on the column tie rods.

What we claim and desire to secure by Letters Patent is:—

1. The combination in a two cycle combustion engine, of a cylinder made up of three sections, the two end sections being of like construction, an intermediate section having therethrough two sets of inlet ports which are out of vertical and horizontal alinement and opposite thereto exhaust ports, the exhaust ports being of such a length as to extend beyond the aforesaid inlet ports, converging passages for both the inlet and the outlet ports in the line of gas flow.

2. An internal combustion engine having a cylinder made up of end sections and a single intermediate section, said latter section having two sets of inlet ports which are located on one of the sides of the cylinder, the opposite side of the cylinder having a plurality of longitudinal outlet ports which extend beyond the ends of the first mentioned ports, the aforesaid section having converging passages for both inlet and outlet ports, in the line of the gas flow.

In witness whereof we affix our signatures.

RICHARD BARNS MORISON.
R. E. TUCKER.
H. R. EVANS.
WALTER SCOTT BURN.